W. R. BROSS.
HEATING SYSTEM FOR AUTOMOBILES.
APPLICATION FILED FEB. 19, 1914.
1,126,378.
Patented Jan. 26, 1915.
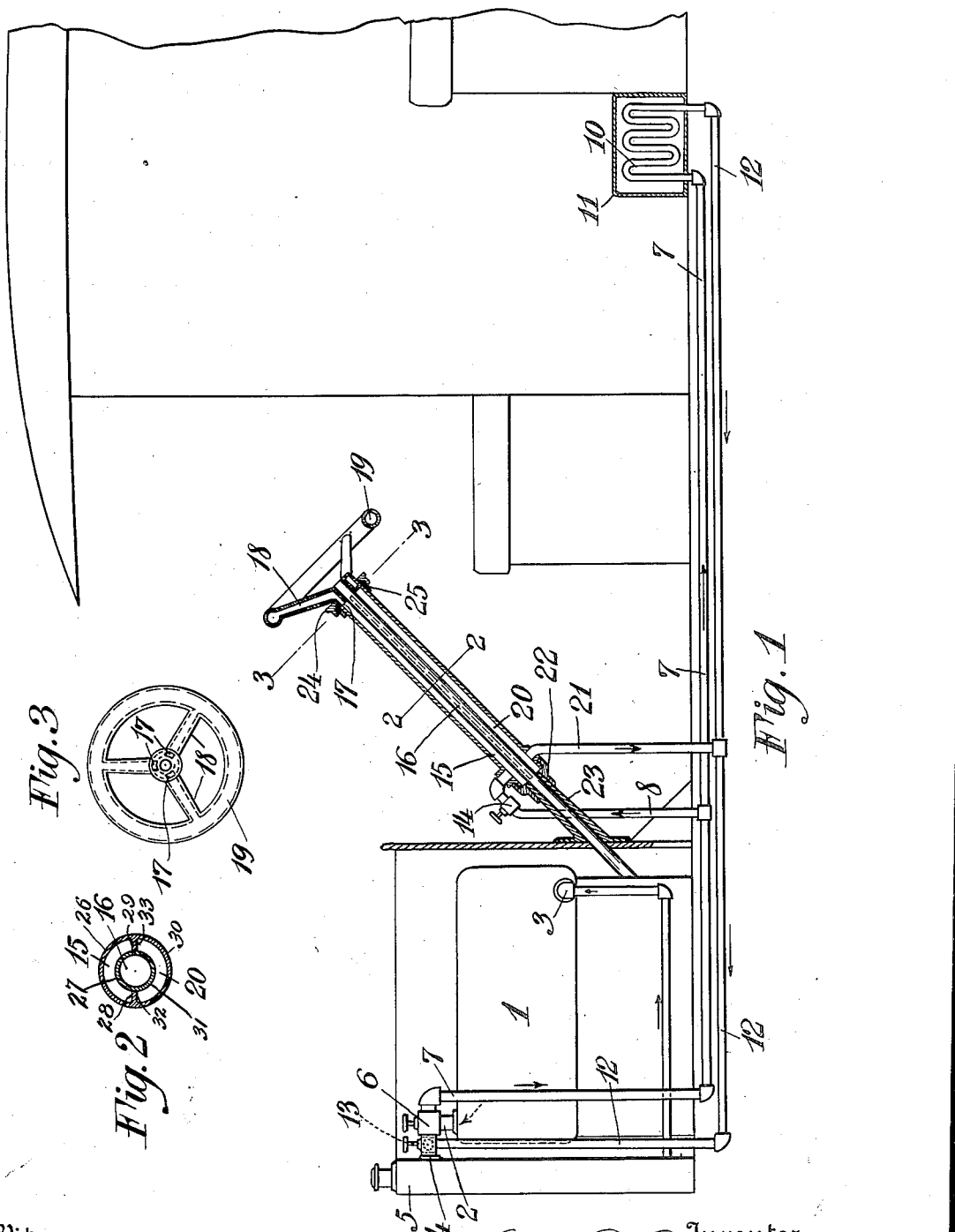
Witnesses:
S. M. Baeder
K. H. Le Card
Inventor
William R. Bross.
By his Attorneys
Mastick & Lucke

UNITED STATES PATENT OFFICE.

WILLIAM R. BROSS, OF BABYLON, NEW YORK.

HEATING SYSTEM FOR AUTOMOBILES.

1,126,378.  Specification of Letters Patent.  Patented Jan. 26, 1915.

Application filed February 19, 1914. Serial No. 819,643.

*To all whom it may concern:*

Be it known that I, WILLIAM R. BROSS, a citizen of the United States of America, and a resident of the city of Babylon, county of Suffolk, State of New York, have invented a new and useful Improvement in Heating Systems for Automobiles, of which the following is a specification.

This invention relates to heating systems for automobiles particularly for providing heating means adjacent the seats of the automobile whereby the occupants of the car may obtain comfort during cold weather.

My invention further contemplates providing heating means for the hands of the chauffeur preferably by the provision of heating means within the steering wheel itself.

In the preferred forms of my invention, the heating for the occupants of the car and for the chauffeur through the steering wheel is effected by connecting pipes with the radiator or casing of the engine whereby the water or other cooling fluid for the engine is utilized as the heating medium of the heaters and the heating medium flowing through the steering wheel. In conjunction with my heating system for automobiles, I have devised a hollow steering wheel coacting with an improved casing extending about the steering post whereby the circulation of the hot water leaving the engine casing is effectually circulated up one side of the steering post, then through the steering wheel, and then on another side of the steering post back to the radiator or back to the engine casing. These improvements I effect by instrumentalities which occupy substantially the same space as the ordinary fixtures of the car.

Other features and objects of my invention will be more fully understood from the accompanying drawings, in which—

Figure 1 is a sectional view of an automobile provided with a system of heating in accordance with my invention. Fig. 2 is a detail section on the line 2—2 of Fig. 1 somewhat enlarged; and Fig. 3 is a bottom view of the steering wheel detached from the steering post on the line 3—3.

Referring to the drawings, the multiple engine 1 is provided with the usual water cooling jacket having outlet 2 and inlet 3. The outlet 2 is shown connected to the inlet 4 of radiator 5, preferably by a three-way valve 6. To one port of the three-way valve 6 is connected the pipe 7 extending toward the bottom of the car and then longitudinally of the car until the piping 8 is reached extending upwardly toward the steering post. The piping 7 is shown also having a branch extending to one or more heating coils 10 disposed adjacent the seat or seats of the automobile.

Preferably, each heating coil 10 is provided with an inclosing casing 11, the interior of said casing 11 constituting a vacuum chamber. By providing a vacuum, the heating effected for the comfort of the passenger or passengers is kept under limits whereby excessive temperatures on the exterior of the casing are precluded. Each heating coil 10 is connected at its outlet to a piping 12 extending forwardly of the automobile and connected to the inlet 4 of the radiator 5. The piping 12, is provided with a valve 13 for cutting out the heating coil or coils 10, as may be desired under warmer temperature conditions. I prefer to place such valve 13 to be readily accessible under the engine hood, although such valve 13 may be disposed at other convenient portions of my heating system.

Referring now specifically to my arrangement for heating the steering wheel, the inflowing pipe 8 is connected through valve 14 to the inflowing semi-annular compartment 15 embracing the steering post 16, whereby the heated water flows upwardly and out at the open upper end and into the inlet 17 of a hollow spoke 18 of the steering wheel. The semi-annular compartment 15 comprises the outside convex wall 26, the inside concave wall 27 and the side walls 28, 29. I also make the peripheral rim 19 of the steering wheel of hollow construction communicating with the three or more hollow spokes 18. The outflow of the water is through the outflowing semi-annular compartment 20 downwardly along the steering post, then into piping 21, connecting with the return piping 12. The semi-annular compartment 20 comprises the outside convex wall 30, the inside concave wall 31 and the side walls 32, 33.

The semi-annular compartments 15, 20, form a complete circumference embracing the steering post 16 as is shown in Fig. 2. The compartments 15, 20 are positioned at the bottom by the adjustable clamping ring 22 having screw-threaded connection with the fixed sleeve 23. The upper ends of the compartments 15, 20 are open and communicate with the respective inlets 17 at the hub of the steering wheel 19 communicating respectively with the three hollow spokes 18. An adjustable cap 24 with a gasket 25 are provided for maintaining a good liquid-tight joint. Thus for any position of the steering wheel, the flow through the outer rim 19 will take place by the liquid flowing through either one or two of the hollow spokes 18 and returning through the remaining two or one, respectively, as the case may be.

The valve 14 may be disposed at other positions than that indicated in the drawing; however, the location as indicated permits ready accessibility and ready adjustment by the chauffeur or driver while seated at the steering post. It will be noted that I have arranged the flow of the heating medium through the steering post and through one or more heating units 10 as in parallel, whereby the heating of the steering wheel is adjusted independently of the heating effected at the other heating means, particularly when my vacuum heating arrangement is utilized. It will also be noted that my heating system does not disturb the normal relation between the pump (not shown) and the radiator for effecting proper cooling of the water by the radiator and proper circulation through the water casing and radiator by the pump.

Whereas I have shown my invention as embodied in one form, it will be understood that many changes and modifications may be made without departing from my invention.

What I claim and desire to secure by Letters Patent is:

1. The combination with a controlling device comprising a rotary member and a cooperating member, said rotary member having hollow parts the interior of which forming a continuous passage for a heating medium, of semi-annular means embracing said coöperating member forming an inflow compartment, semi-annular means embracing said coöperating member forming an outflow compartment, each of said semi-annular means communicating at its upper end with said continuous passage, and means for removably holding said semi-annular means in stationary relation.

2. The combination of a rotary member having a hollow rim the interior of which forms a passage for a heating medium, a relatively long controlled member, one end of which is disposed adjacent said rotary controlling member, means for holding said controlled member in position, said means being disposed at the opposite end of said controlled member, semi-annular means embracing said controlled member forming an inflow compartment, semi-annular means embracing said controlled member forming an outflow compartment, chambered means communicating with said semi-annular means and with the interior of said hollow rim, and means supported by said holding means for retaining said semi-annular means in position.

3. The combination of a rotary member comprising a hollow rim element, and a plurality of hollow spoke elements, the interior of the latter communicating respectively with the interior of said hollow rim element, a coöperating circular member disposed along the axis of said rim element, means surrounding said circular member forming two semi-annular compartments respectively serving as inflow and outflow compartments, and communicating with said hollow spoke elements, and means for removably holding said compartment means in stationary relation.

4. The combination with a steering post and a steering wheel comprising a hollow rim element, hollow spoke elements, the interior of the latter communicating with the interior of said hollow rim element, and a hub element having passages respectively communicating with the interiors of said spoke elements, of means extending along and surrounding the post of said steering wheel forming semi-annular compartments respectively serving as inflow and outflow compartments, said compartments having open upper ends communicating with the passages of said hub elements, and means for holding said compartments stationary.

In testimony whereof I have signed this specification in the presence of two subscribing witnesses.

WILLIAM ROBERT BROSS.

Witnesses:
 ALBERT R. PALMER,
 HENRY J. LUCKE.